US008152632B2

(12) United States Patent
Fong

(10) Patent No.: US 8,152,632 B2
(45) Date of Patent: Apr. 10, 2012

(54) GAMING MACHINE FOR USE IN A SYSTEM WITH A COMMON BONUS FEATURE

(75) Inventor: Colin Fong, Lane Cove (AU)

(73) Assignee: Aristocrat Technologies Australia Pty Ltd. (AU)

( * ) Notice: Subject to any disclaimer, the term of this patent is extended or adjusted under 35 U.S.C. 154(b) by 1025 days.

(21) Appl. No.: 10/776,145

(22) Filed: Feb. 10, 2004

(65) Prior Publication Data

US 2004/0224746 A1 Nov. 11, 2004

(51) Int. Cl.
*A63F 13/00* (2006.01)

(52) U.S. Cl. ............................... 463/27; 463/20; 463/42

(58) Field of Classification Search .................... 463/30, 463/16, 26, 20, 25, 27, 40, 42
See application file for complete search history.

(56) References Cited

U.S. PATENT DOCUMENTS 6,254,481 B1 7/2001 Jaffe
6,416,409 B1 * 7/2002 Jordan ............................ 463/27
2003/0064779 A1 4/2003 Suda
2003/0119581 A1 * 6/2003 Cannon et al. .................. 463/25
2003/0220139 A1 * 11/2003 Peterson ......................... 463/30

* cited by examiner

*Primary Examiner* — James S McClellan

(74) *Attorney, Agent, or Firm* — McAndrews, Held & Malloy, Ltd.

(57) ABSTRACT

A gaming machine system includes a system controller. A plurality of gaming machines are linked to the system controller. Each gaming machine has a first display and a game controller arranged to control images of symbols displayed on the first display, the game controller being arranged to play a game wherein at least one random event is caused to be displayed on the first display and, if a predefined winning event occurs, the machine awards a prize; a second display; and a feature game where, during play of the feature, feature images associated with the feature game are displayed on the second display. The system further includes a remote display to which each of the gaming machines is connected. The remote display is visible to a player playing any one of the gaming machines connected to the remote display. Images appearing on the displays of any of the gaming machines of the system participating in the feature game are related to images displayed on the remote display and the feature images are used in determining outcomes on those gaming machines participating in the feature game.

41 Claims, 11 Drawing Sheets

GAMING MACHINE FOR USE IN A SYSTEM WITH A COMMON BONUS FEATURE

FIELD OF THE INVENTION

This invention relates to a gaming machine. More particularly, the invention relates to a gaming machine, to a gaming machine system and to an improvement to a game played on the gaming machines linked to form the system.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to a first aspect of the invention, there is provided a gaming machine system which includes a system controller;

a plurality of gaming machines linked to the system controller, each gaming machine having a first display and a game controller arranged to control images of symbols displayed on the first display, the game controller being arranged to play a game wherein at least one random event is caused to be displayed on the first display and, if a predefined winning event occurs, the machine awards a prize; a second display; and a feature game where, during play of the feature, feature images associated with the feature game are displayed on the second display; and a remote display to which each of the gaming machines is connected, the remote display being visible to a player playing any one of the gaming machines connected to the remote display, at least certain of the feature images occurring on at least one of the displays of at least one of the gaming machines during the playing of the feature game on the at least one gaming machine cooperating with the feature images displayed on the remote display and the feature images being used in determining a feature outcome on the at least one gaming machine participating in the feature game.

The game may comprise a base game preceding the feature game, the feature game following the occurrence of a trigger condition in the base game. The base game preceding the feature game may, conveniently, be a spinning reel game. During the playing of the base game, an attract mode display of images may be displayed on the second display and on the remote display. Further, during the playing of the base game, one or more progressive jackpot meters may be incremented by a percentage of a player's total bet. The progressive values may be hidden from view or displayed, for example, on the second display of the gaming machines and/or the remote display of the system.

The system controller may control, amongst other things, a progressive jackpot prize and, occurrence of a trigger condition. For example, the system controller may randomly select a number representative of a monetary amount falling in a fixed range between a lower value and an upper value of a progressive jackpot. When the progressive jackpot value is incremented to that value by one of the linked gaming machines, the feature game may be initiated by the system controller. It may be a requirement that the players have to perform an additional action to be eligible to participate in the feature game. For example, each player may have to wager an additional bet, wager the maximum bet or be playing at greater than a predetermined minimum rate in order to be eligible to participate in the feature game when it is triggered.

In one embodiment of the invention, a predetermined trigger condition, triggered by one of the game controller and the system controller, occurring during playing of a base game on any one of the gaming machines may cause the feature game to commence, the trigger condition being configured so that, when it occurs on any one of the gaming machines, all active gaming machines enter the feature game. By "active" is meant those gaming machines of the system being played at the time the trigger condition occurs and, if applicable, in accordance with the eligibility requirements described above.

In another embodiment of the invention, the feature game may be an ongoing feature where, whenever a trigger condition, triggered by one of the game controller and the system controller, occurs on any one gaming machine to trigger the feature game, the feature game commences on that gaming machine, any other gaming machines continuing with the base game until the feature game is triggered on said any other gaming machines.

The second display of each gaming machine may display a plurality of feature images and, when the trigger condition occurs in the base game and the feature game is initiated, an initial display on the first display of the gaming machine is icons relating to the feature images on the second display of that gaming machine.

Each gaming machine may therefore include a selector operable by a player of the feature game to enable the player to make at least one selection associated with the feature game. Initially the player may select one of the icons.

The feature game may involve playing for prizes associated with the remote display. Representations of the prizes may be arranged, at least initially, in a concealed condition on the remote display.

Prizes may be associated with predetermined, hidden places on a representation of a location displayed on the remote display. The images appearing at least on the first display of each participating gaming machine may be synchronized with the images appearing on the remote display. Thus, a representation of the location similar to that displayed on the remote display may be displayed on the first display and the player, using the selector, may select a position on the representation of the location which the player believes will result in a prize-winning outcome of the feature game. The selector used by the player may be a touch sensitive facility of the first display of the gaming machine and the player may select the position by touching a grid marking on the first display overlying the selected position. It will be appreciated that, instead of the touch sensitive facility of the first display, or in addition thereto, the selector may comprise a button on the midtrim of the gaming machine.

One of the game controller and the system controller may cause a prize to be replaced whenever any prize is revealed during playing of the feature game.

The feature game may comprise a fixed set of prizes so that the prizes at the positions of the representation of the location are not predictable. The fixed set of prizes may include progressive jackpot prizes.

According to a second aspect of the invention, there is provided a gaming machine having a first display and a game controller arranged to control images of symbols displayed on the first display, the game controller being arranged to play a game wherein at least one random event is caused to be displayed on the first display and, if a predefined winning event occurs, the machine awards a prize, the gaming machine further including a second display, arranged apart from the first display;

a remote display arranged remote from, but visible to a player of, the gaming machine; and a feature game where, during play of the feature, feature images associated with the feature game are displayed on the second display, at least certain of the feature images occurring on at least one of the displays of at least one of the gaming machines during the playing of the feature game on the at least one gaming machine cooperating with feature images displayed on the remote display and the feature images being used in determining a feature outcome on the at least one gaming machine participating in the feature game.

The gaming machine may include a selector operable by the player of the feature game to enable the player to make at least one selection associated with the feature game. Preferably, the selector is a touch-screen facility of the first display.

The gaming machine may include a cabinet in which the first display is mounted. Further, the gaming machine may include a top box mounted on the cabinet, the further display being, conveniently, mounted in the top box. The first display may be a primary display with the second display being a secondary display.

The game may comprise a base game preceding the feature game, the feature game following the occurrence of a trigger condition in the base game. The base game preceding the feature game may, conveniently, be a spinning reel game.

According to a third aspect of the invention, there is provided a method of operating a gaming machine system, the system comprising a plurality of gaming machines linked to a system controller and to a remote display, each gaming machine comprising a first display and a game controller arranged to control images of symbols displayed on the first display, a second display, arranged apart from the first display, a feature game where, during play of the feature, feature images associated with the feature game are displayed on the second display, the feature images being used in determining an outcome associated with the feature game, the method comprising causing the feature game to commence following the occurrence of a trigger condition occurring during the playing of a base game on at least one of the gaming machines of the system; and causing feature images occurring on at least one of the displays of at least one of the gaming machines during the playing of the feature game on the at least one gaming machine to cooperate with feature images occurring on the remote display and using the feature images in determining a feature outcome on the at least one gaming machine participating in the feature game.

The method may include causing a predetermined trigger condition occurring during playing of a base game on any one of the gaming machines to commence the feature game.

In one embodiment of the invention, the method may include configuring the trigger condition so that, when it occurs on any one of the gaming machines, all active gaming machines enter the feature game. The method may include causing the system controller to control occurrence of the trigger condition. Thus, the system controller may randomly select a number representative of a monetary amount falling in a fixed range between a lower value and an upper value of a progressive jackpot and when the progressive jackpot value is incremented to that value by one of the linked gaming machines, the feature game is initiated by the system controller and all gaming machines of the system being played at that time commence the feature game.

In addition, the method may include setting other conditions with which a player must comply in order to be eligible to participate in the feature game. For example, each player may have to wager an additional bet, wager the maximum bet or be playing at greater than a predetermined minimum rate in order to be eligible to participate in the feature when it is triggered.

In another embodiment of the invention, the feature game may be an ongoing feature where, whenever a trigger condition occurs on any one gaming machine to trigger the feature game, the feature game commences on that gaming machine, any other gaming machines continuing with the base game until the feature game is triggered on said any other gaming machines.

The method may include displaying on the second display of each gaming machine a plurality of feature images and, when the trigger condition occurs in the base game and the feature game is initiated, displaying as an initial display on the first display of the gaming machine icons relating to the feature images on the second display of that gaming machine. By means of the touch-screen facility or, where that is not available, by a button on a midtrim of the gaming machine, the player may select one of the icons.

The method may include playing for prizes associated with the remote display during the feature game. At least initially, the method may include concealing representations of the prizes on the remote display. Thus, the method may include associating prizes with predetermined, hidden places on a representation of a location displayed on the remote display.

The method may include displaying a representation of the location, similar to that displayed on the remote display, on the first display and prompting the player to select a position of the location which the player believes will result in a prize-winning outcome of the feature game.

Further, the method may include displaying a scene on the second display representative of the selected icon moving towards the location which is displayed on the remote display and on the first display of the gaming machine. Then, the method may include displaying a representation of the selected icon arriving at the selected position at the location and revealing the representation of the prize.

The method may include selecting the prize from a fixed set of prizes randomly distributed by one of the game controller and the system controller at the positions of the location. Further, the method may include replacing a prize whenever any prize is revealed during playing of the feature game.

Whenever any prize is revealed, the method may include replacing a prize of the same value as the revealed prize at the location but at a different position and, once again, hidden from view. Once a selection of a prize has been made, the method may include again randomly distributing all outcomes over all the positions of the location.

The method may include randomly shuffling the set of prizes so that the next outcome is selected from a new distribution of prizes about the positions of the location.

BRIEF DESCRIPTION OF THE DRAWINGS

An embodiment of the invention is now described by way of example with reference to the accompanying diagrammatic drawings in which:—

DETAILED DESCRIPTION OF THE PREFERRED EMBODIMENT

Figure 1:
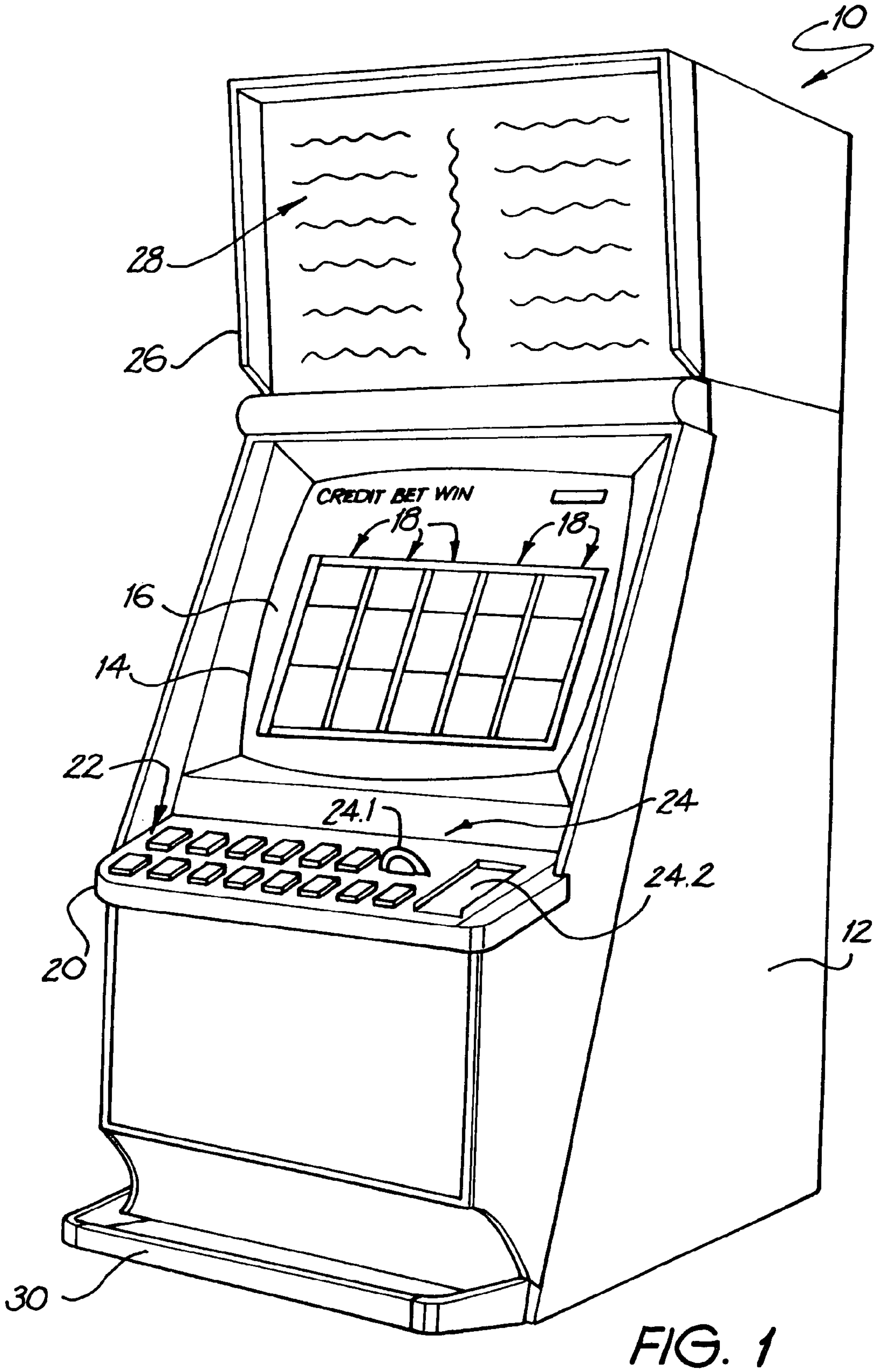
FIG. 1 shows a perspective view of a gaming machine, in accordance with a first aspect of the invention.

In FIG. 1, reference numeral 10 generally designates a gaming machine, in accordance with an embodiment of the invention. The machine 10 includes a console 12 having a first display, or screen, in the form of a video display unit 14 on which a game 16 is played, in use. The video display unit 14 may be implemented as a cathode ray screen device, a liquid crystal display, a plasma screen, or the like. The game 16 has a base game which, for example, is a spinning reel game that simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 in which a second display, or screen, 28 is mounted. While the gaming machine 10 is not being played or a base game of the game 16 is being played, the screen 28 displays feature images of a feature of the game as will be described in greater detail below.

A coin tray 30 is mounted beneath the console 12 for cash payouts from the machine 10.

Figure 2:
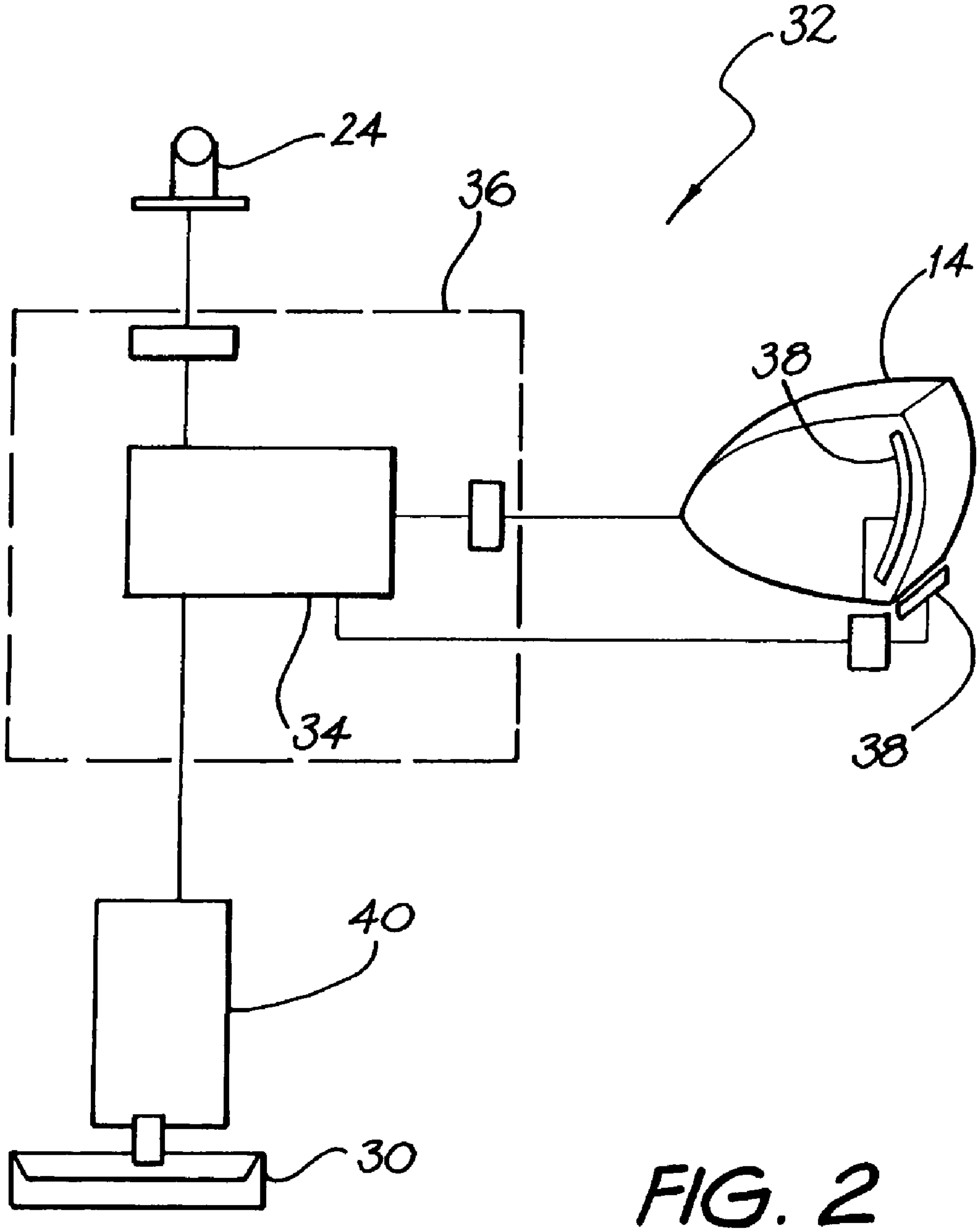
FIG. 2 shows a block diagram of a control circuit of the gaming machine.

Referring to FIG. 2 of the drawings, a control means or control circuit 32 is illustrated. A program which implements the game and user interface is run on a processor 34 of the control circuit 32. The processor 34 forms part of a controller 36 that drives the screens 14 and 28 and that receives input signals from sensors 38. The sensors 38 include sensors associated with the bank 22 of buttons and touch sensors associated with the screen 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
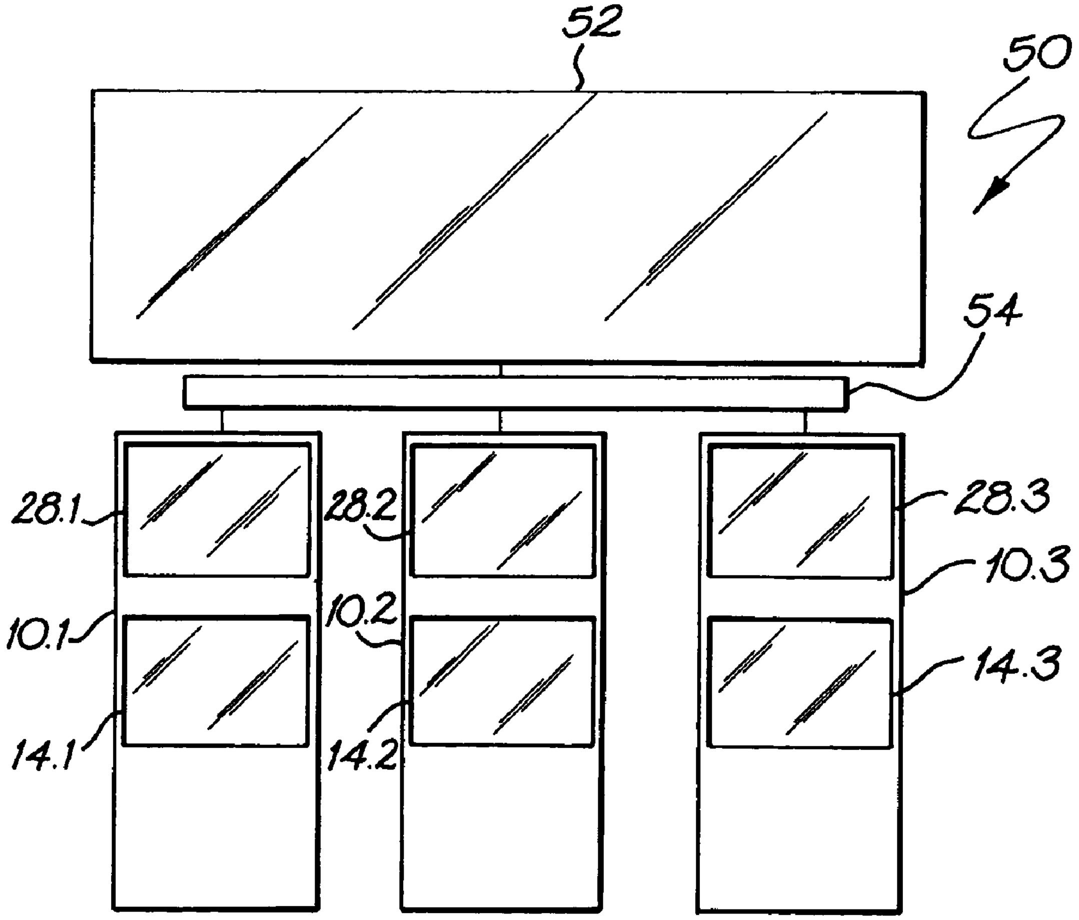
FIG. 3 shows a block diagram of a gaming machine system, in accordance with a second aspect of the invention.

The gaming machine 10 forms part of a gaming machine system indicated generally by the reference numeral 50 in FIG. 3 of the drawings. The system 50 comprises a plurality of gaming machines indicated schematically by gaming machines 10.1, 10.2 and 10.3. Each gaming machine 10 includes its first display 14 and its second display 28.

The system 50 further includes a third, remote screen display, or screen, 52 to which each of the gaming machines 10 is connected. The screen 52 is visible to each player on any one of the gaming machines 10 of the system 50.

Preferably, the screen 52 is a plasma screen display.

The gaming machines 10 are linked to the screen 52 via a central controller 54. The central controller 54 monitors what is displayed on the screen 52 and also monitors progressive jackpot values and distributions as for a standard linked progressive jackpot system.

As indicated above, the screen 14 of each gaming machine 10 has a touch screen facility which is used as a selector by a player of the game to facilitate playing of the game 16.

Figure 4:
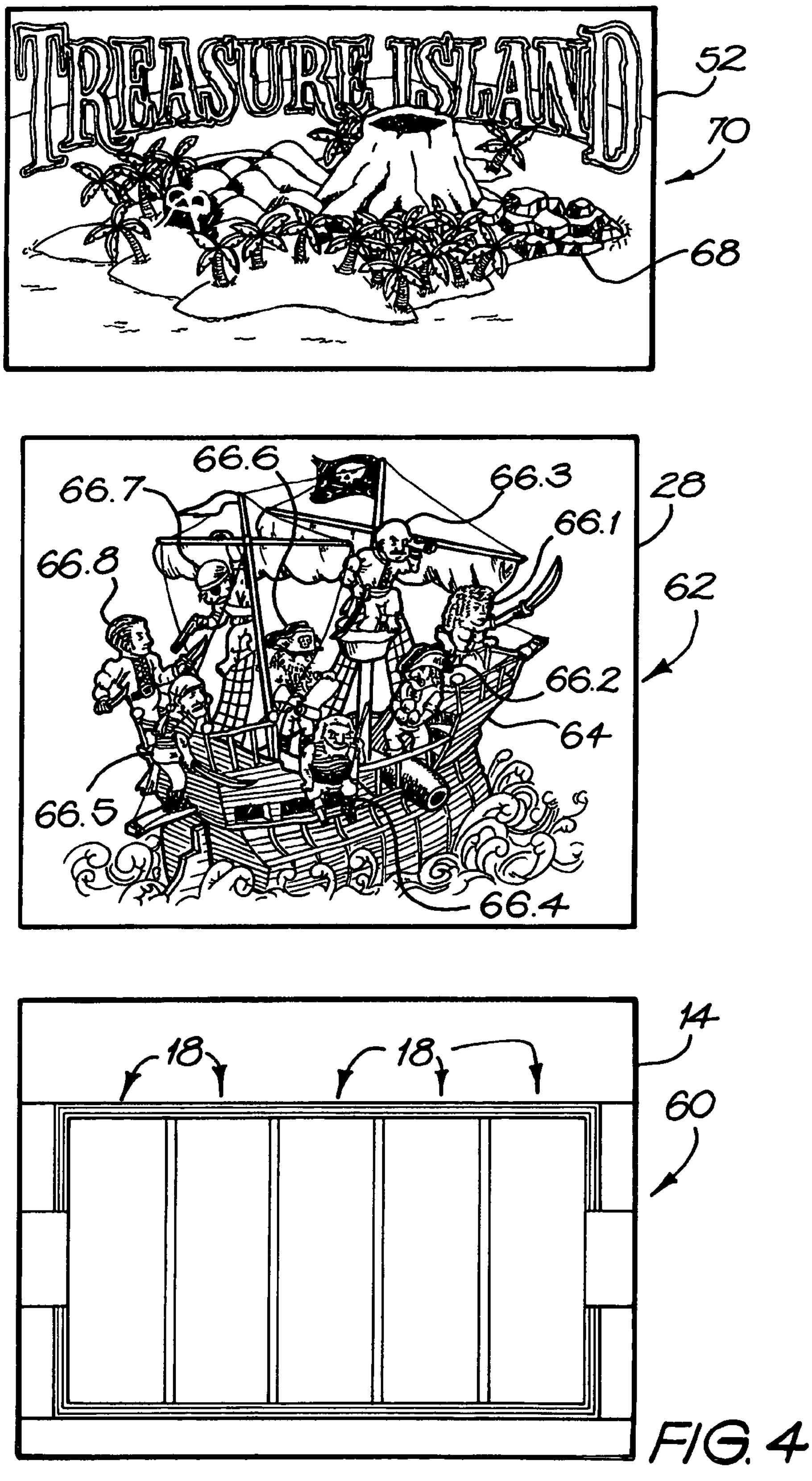
FIGS. 4 to 10 show a sequence of images displayed on a primary display and a secondary display of one of the gaming machines of the system and a remote display of the system during the playing of a game on the system.

The game 16 has a standard, five spinning reel base game where a representation of reels 18 is displayed on the screen 14 as shown in the screen display 60 in FIG. 4 of the drawings.

When the gaming machines 10 are not being played or the feature has not been triggered, an attract mode display 62, which is themed to the game 16, is displayed on the screen 28 in the top box 26 of each gaming machine 10. The game 16 is a Treasure Island game and the themes on the display 62 are of a pirate ship 64 with a plurality of feature icons in the form of pirate characters 66.1-66.8 (referred to below as “pirates”). Further, while the base game is being played on the gaming machines 10 or the gaming machines 10 are not being played, an attract mode of an island 68 is displayed on a display 70 on the remote screen 52.

When the spinning reel base game is being played on any of the gaming machines 10 of the system 50, one or more progressive meters (not shown) is incremented by a percentage of total bet by the central controller 54 of the system 50. The progressive values may either be hidden from view or displayed, for example, on the top screens 28 of each gaming machine 10 of the system 50 and/or the screen 52 of the system 50. As for a standard linked progressive system, bet information is sent to the central controller 54 for each game played on the gaming machines 10 so that the progressive meters can be updated. If a progressive prize is won, the central controller 54 notifies the gaming machine 10 that has won the progressive prize of the amount won and resets the progressive meters to their start-up values. Similarly, the central controller 54 notifies the gaming machines 10 of fixed prizes that are won during the feature.

In another embodiment of the invention, the central controller 54 of the system 50 may handle only the progressive prizes. There is a set of fixed prizes in the feature that is determined by the triggering gaming machine 10. When a trigger condition occurs on one of the gaming machines 10, the gaming machine 10 determines if a progressive prize has been won. If it has, the gaming machine 10 notifies the central controller 54 which pays the prize by “sending” it back to the triggering gaming machine 10 where the prize is revealed. If a progressive prize has not been won, the gaming machine randomly selects the fixed prize to be awarded from a predetermined table or set of prizes. The gaming machine 10 notifies the central controller 54 of the prize selected to be revealed on the screen 52 of the system 50.

A predetermined trigger condition initiates the Treasure Island feature. Either the system 50 could be played as a tournament where all gaming machines 10 enter the feature at the same time on the occurrence of a mystery trigger generated by the central controller 54. The mystery trigger may occur by the central controller 54 randomly selecting a number representative of a monetary amount which falls in a fixed range between a lower value and an upper value of a progressive jackpot. When the progressive jackpot meters of any one of the gaming machines 10 is incremented to the selected value, the tournament is initiated by the controller 54 and all the gaming machines 10 of the system 50 being played at that time commence the feature.

In another embodiment of the invention, the feature is an ongoing feature so that, whenever any one of the gaming machines 10 of the system 50 triggers the feature by means of an appropriate trigger condition, only that gaming machine 10 enters the feature. Whenever any of the other gaming machines 10 then triggers the feature that gaming machine 10 also enters the feature but independently of any other gaming machines 10 currently participating in the feature. The trigger condition could be, for example, the occurrence of a predetermined number of scatter symbols on the display 60 in the base game being played on the gaming machine 10. Instead, the trigger condition could be a progressive jackpot-based trigger such as the applicant's Hyperlink® trigger system ("Hyperlink" is a registered trade mark of Aristocrat Technologies Australia Pty Ltd).

The feature involves the "sending" of one of the pirates 66 by the player of each participating gaming machine 10 to "look" for treasure on the island 68.

Figure 5:
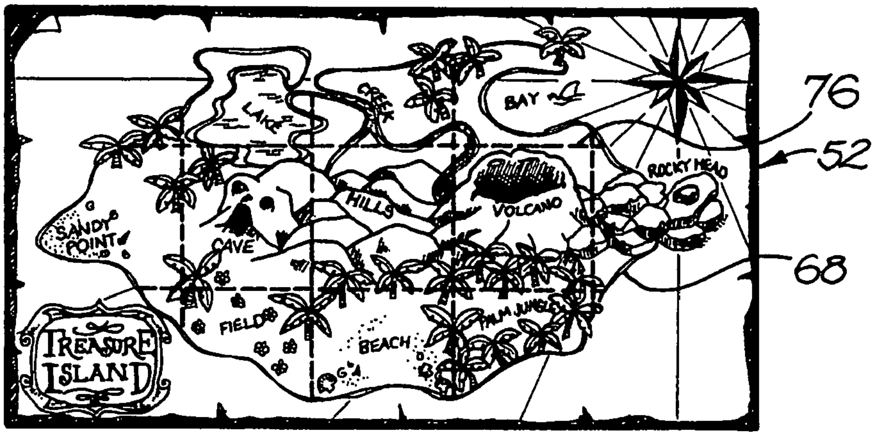
Figure 5:
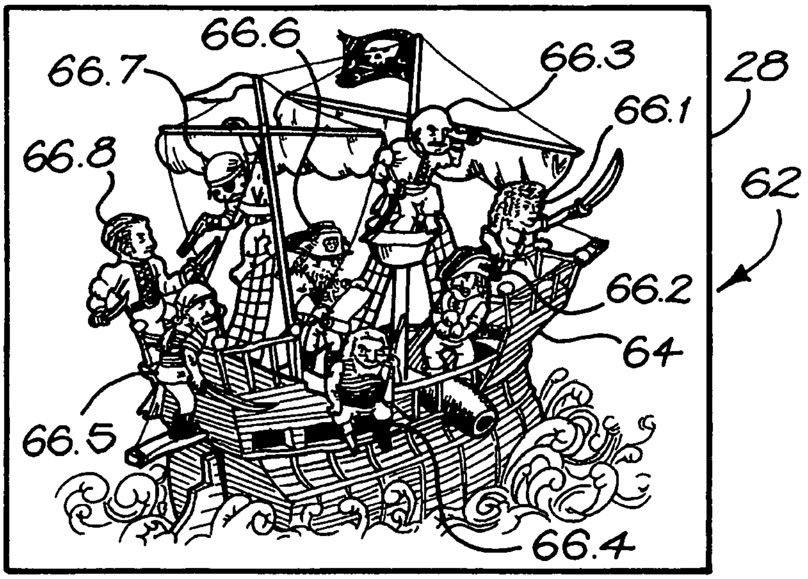
Figure 5:
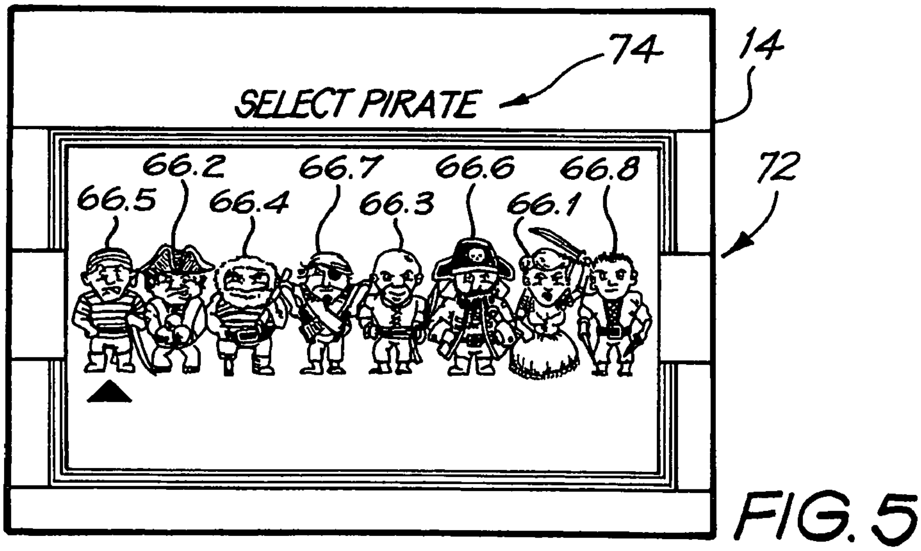
Figure 6:
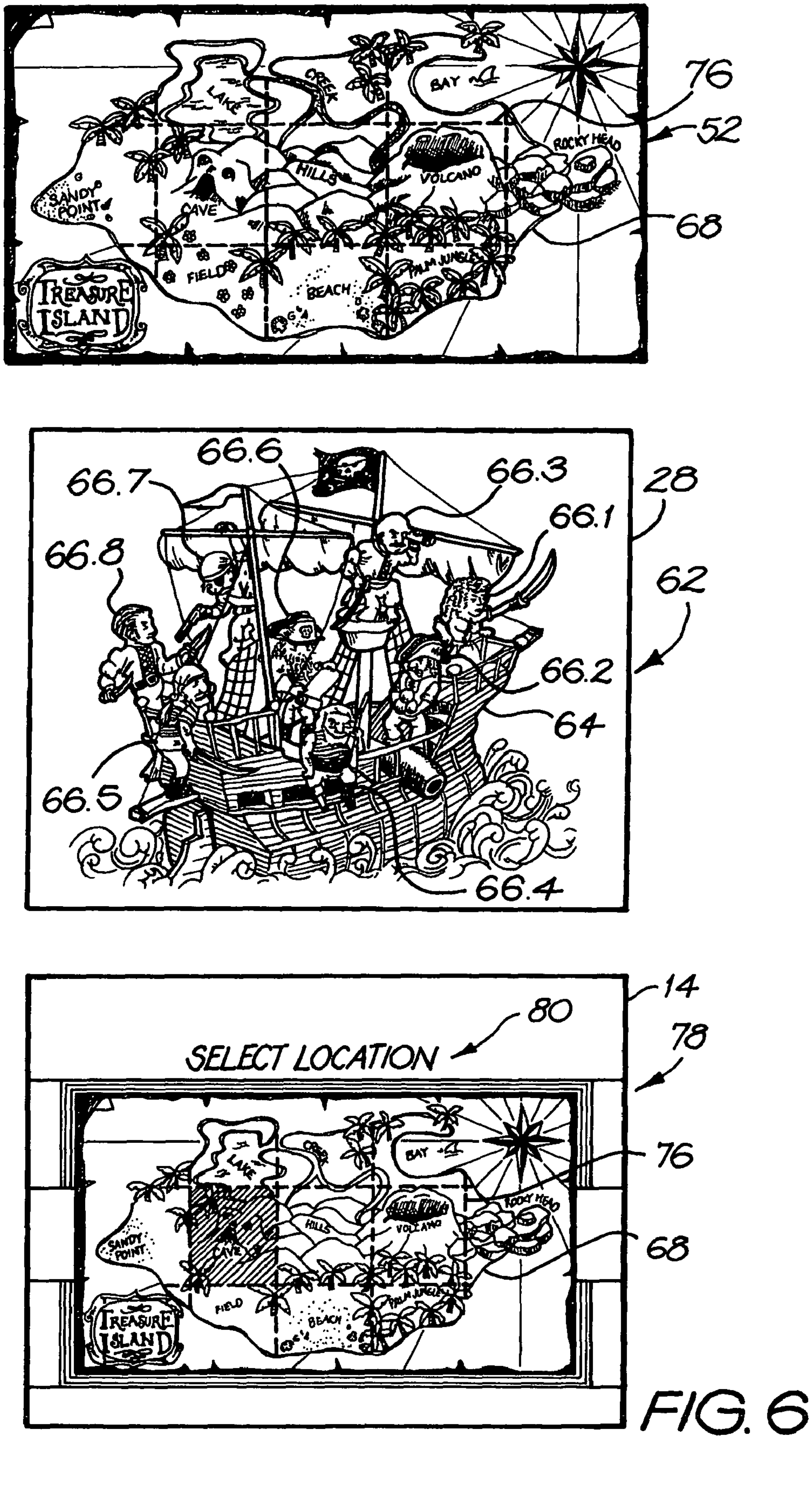

Irrespective of how the feature is triggered, when the feature is triggered, the display on the bottom screen 14 of the gaming machine 10 triggering the feature changes to the display 72 as shown in FIG. 5 of the drawings. In this display, all of the pirates 66.1-66.8 as depicted on the pirate ship 64 in the display 62 are displayed on the screen 14 with a message 74 for the player to select one of the pirates 66.1-66.8.

At the same time, the display of the island 68 on the remote screen 52 changes to a plan view of the island 68 with grid markings 76 overlying the island 68 to divide the island into a plurality of positions or regions.

Once a pirate has been selected by the player of the feature, the image displayed in a following display 78 on the screen 14 of the gaming machine 10 is a similar representation to that on the screen 52, being a plan view of the island 68 with the grid markings 76.

A fixed set of prizes (not shown) is randomly distributed by the gaming machine 10 or the controller 54 at the various positions on the island 68. These prizes remain hidden from view. The prizes include progressive jackpot prizes, whether stand-alone progressive jackpot prizes or linked progressive jackpot prizes.

On the display 78 on the screen 14, the player selects the desired position at which the selected pirate 66.1-66.8 is to dig for buried treasure by touching the appropriate grid location overlying that position on the island 68. A message 80 prompts the player to select the desired position.

Figure 7:
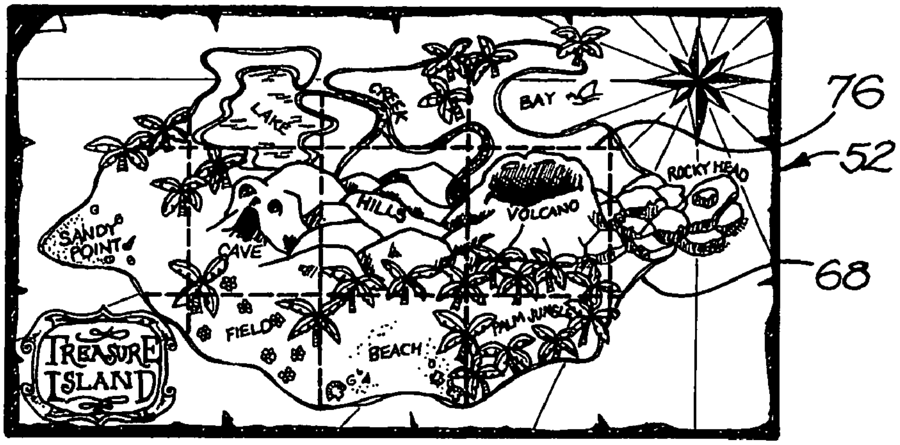
Figure 7:
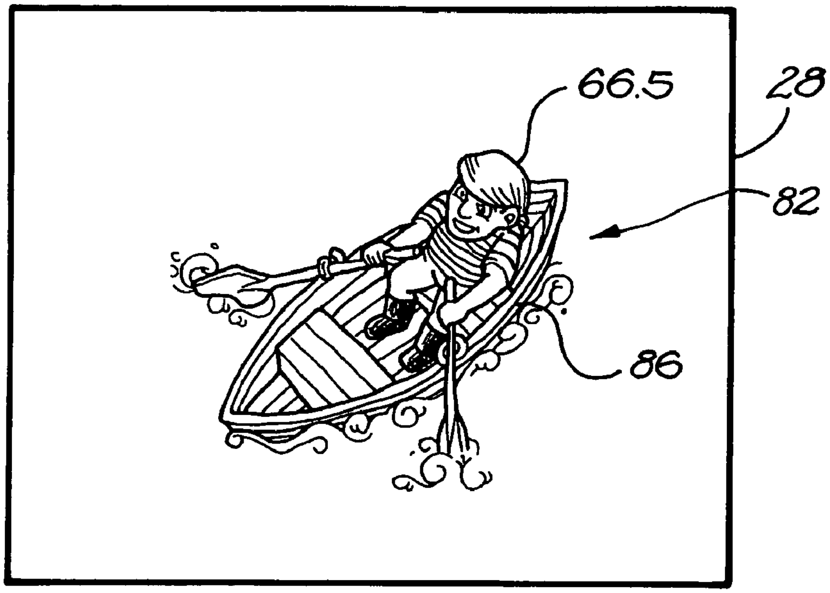
Figure 7:
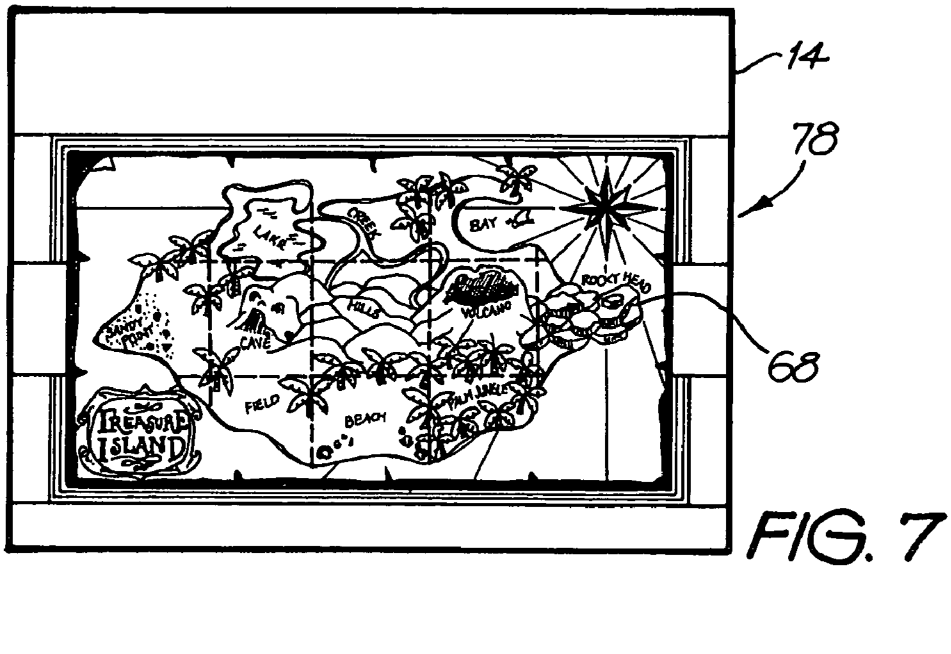

In FIG. 7 of the drawings, the images displayed on the screens 14 and 52 remain the same. However, the image displayed on the second screen 28 changes from a depiction of the pirate ship 64. It is assumed that the player selected pirate 66.5 and the screen 28 changes to a representation 82 of the pirate 66.5 rowing towards the island 68 on the remote screen 52.

Figure 8:
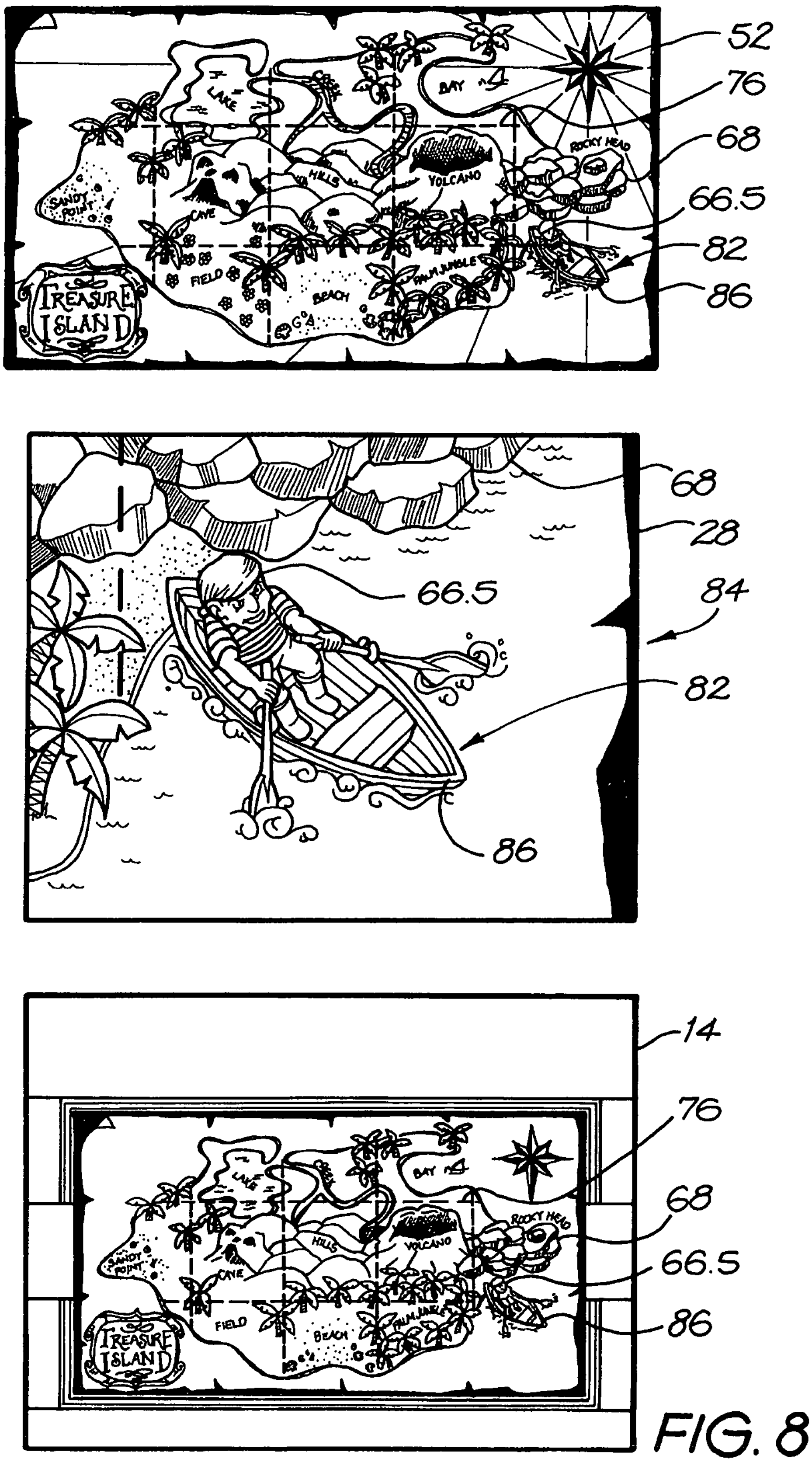

In the next sequence of images, as shown in FIG. 8 of the drawings, a screen display 84 displays a representation 82 of the pirate 66.5 arriving at the island 68. The screen displays on the screens 14 and 52 also change to show the representation 82 of the pirate 66.5 arriving at the island 68 but on a smaller scale so that the representation of the whole island 62 is visible on the screens 14 and 52.

Figure 9:
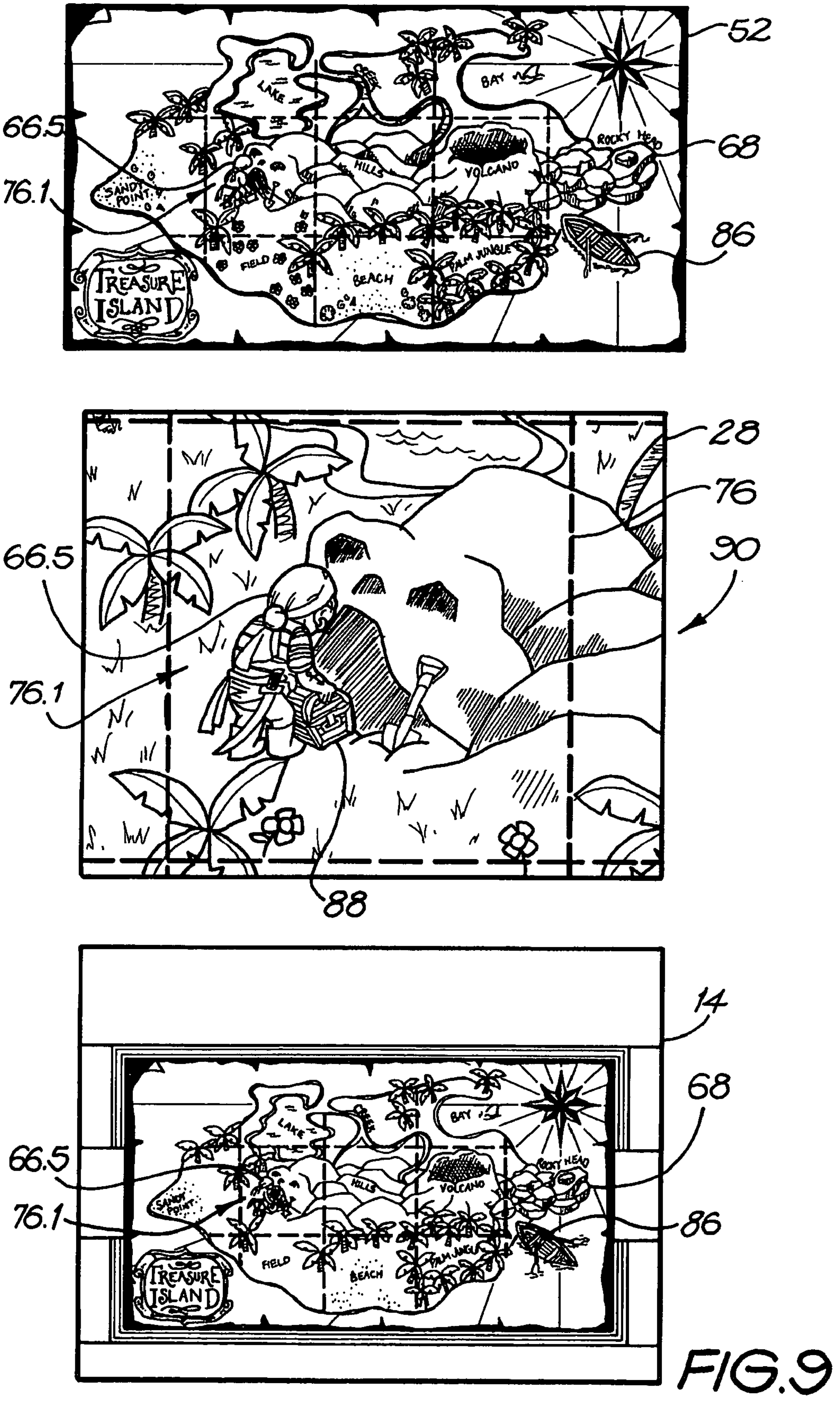

It is assumed that the player had, when required to select the position on the island 68, selected grid position 76.1 on the island 68. The sequence of images shown in FIG. 9 of the drawings therefore shows, on screens 14 and 52, the pirate 66.5 having left his boat 86 and moved across the island 68 to grid position 76.1.

A depiction of the pirate 66.5 withdrawing a treasure chest 88 at grid position 76.1 is shown on the top screen 28 in screen display 90. Whenever a prize is removed from a position of the island 68, then, to indicate to players that there has been a re-distribution of prizes in the set of the prizes and that there is again a prize at the position just selected, an animation of a pirate rowing to the island 68 and burying a treasure chest at the previously vacated position is shown at least on the screen 52 of the system 50.

Figure 10:
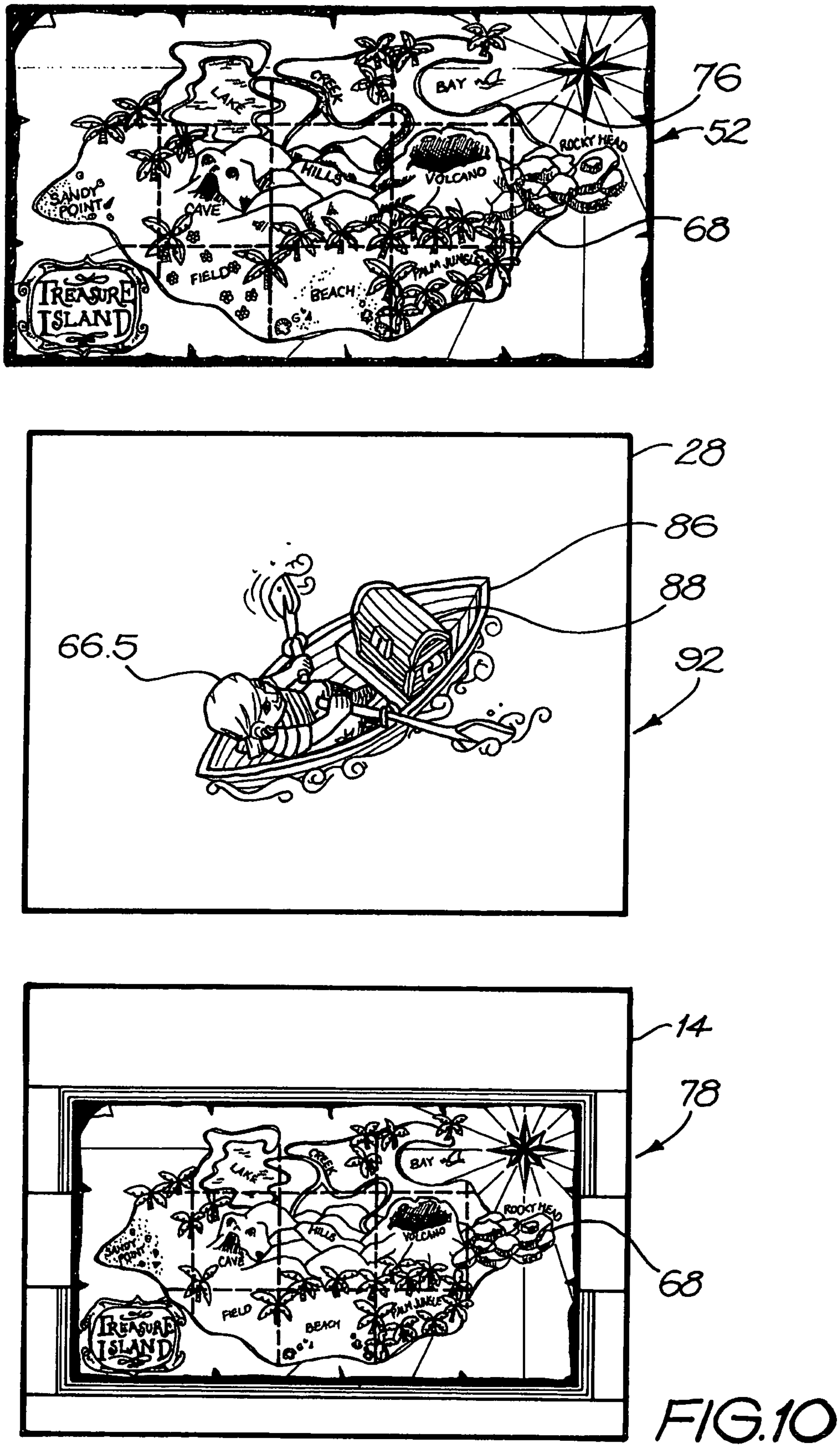
Figure 11:
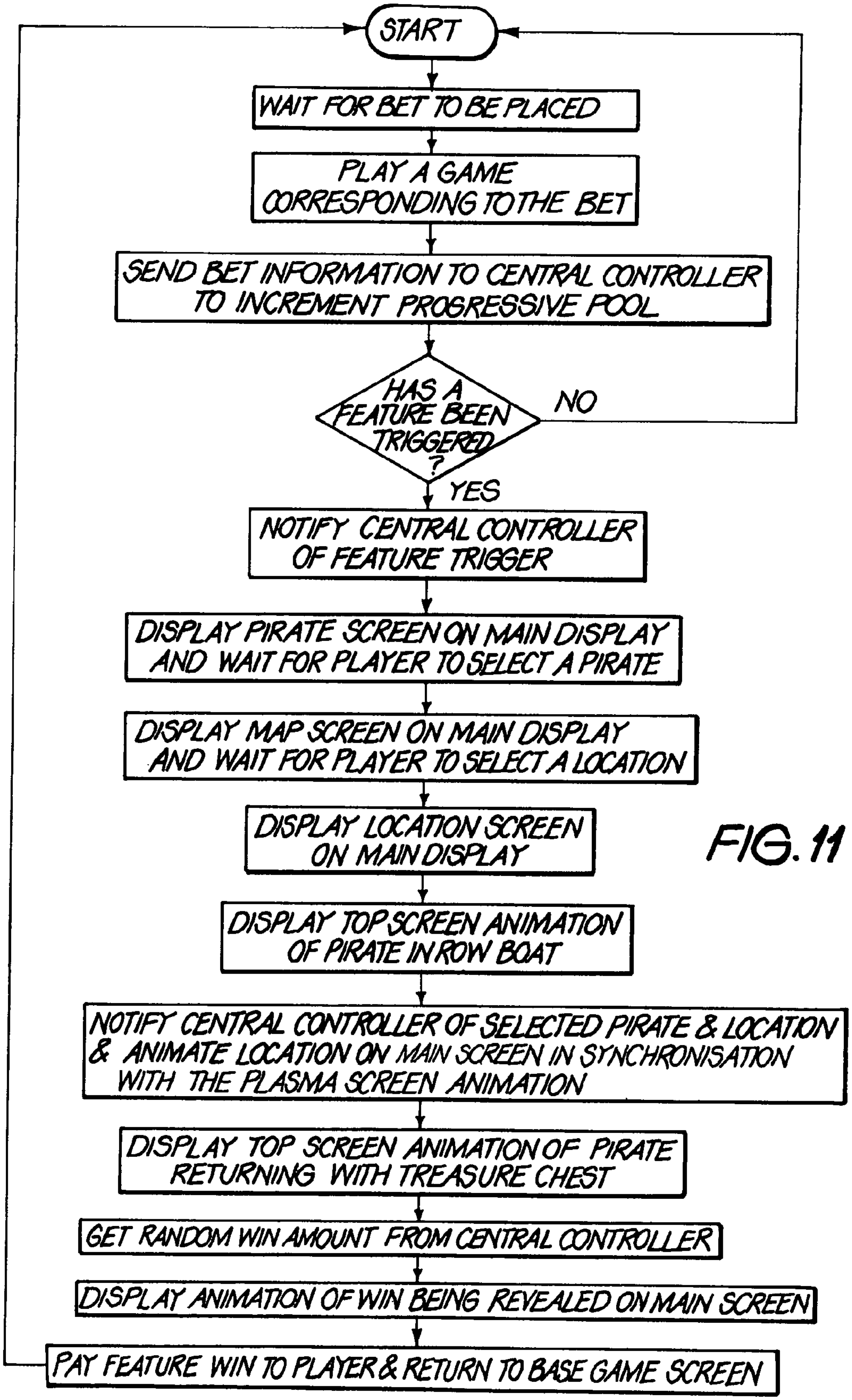
FIG. 11 shows a flow chart of the game.

The pirate 66.5 returns to his boat 86 with the treasure chest 88 and rows from the island 68 back towards the pirate ship 64 as shown on screen display 92 on the top screen 28 in FIG. 10 of the drawings. When the pirate 66.5 has returned to the other pirates 66 the amount won is revealed and paid to the player. This can be effected by way of an animation of the treasure chest 88 opening to reveal the amount won. When the prize is revealed on the main screen 14 of the gaming machine 10, it is also revealed on the screen 52 of the system 50 so that other players and bystanders can be aware of the prize that has been won.

The remote screen 52 is also capable of showing a plan view of the island 68 and the location of any pirate 66 from any one of the gaming machines 10 participating, at that time, in the feature. Hence, if more than one gaming machine 10 has triggered the feature there will be multiple pirates 66 on the island 68 which will be displayed on the screen 52.

It is also possible for multiple triggers to occur on one of the gaming machines 10 such that more than one pirate 66 can be sent by that gaming machine 10 to appear on the island 68 at the same time.

Preferably, whenever a prize is removed by a pirate 66, the same prize amount is replaced at a different position on the island 68. So that the prizes at the positions on the island 68 are not predictable, there is, preferably, a fixed set of prizes. As indicated above, the fixed set of prizes includes progressive jackpot prizes. After a position on the island 68 has been selected by the player, a prize, i.e. a feature outcome, has to be replaced at that position so that, if that place is selected by another player, a prize outcome will be awarded to that other player. Hence, once there has been one selection made, all outcomes are randomly distributed again by the central controller 54 of the system or the triggering gaming machine 10, as the case may be, over all the positions of the island 68 so that exactly the same outcomes and odds exist for other players without the outcomes being or becoming predictable. It will be appreciated that several of the selected pirates 66 may be participating together on the island 68 but when an outcome is selected by any one of the players, that outcome is immediately returned to a set of the outcomes. The set of outcomes is randomly shuffled so that the next outcome is selected from a new distribution of outcomes in the set of outcomes.

Accordingly, it is an advantage of the invention that a feature is provided for a linked system 50 which will considerably enhance player enjoyment and which can be enjoyed by spectators not playing the gaming machines 10. This is as a result of the remote screen 52 being visible, not only by the players of the gaming machines 10, but by other people on the gaming venue's floor. It will however be appreciated that the invention could be implemented on a standalone gaming machine 10.

Another advantage of the invention is that an enjoyable way of awarding progressive jackpot prizes is facilitated. The manner in which the jackpot prizes is awarded also increases the suspense involved in playing a linked progressive jackpot system.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A gaming machine system comprising:

a remote display;

a system controller connected to the remote display;

a plurality of gaming machines, which are remote to the system controller, and linked to the system controller, each gaming machine having a first display, a second display, and a game controller arranged to control images of symbols displayed on the first display, the game controller being arranged to play a game wherein at least one random event is caused to be displayed on the first display and, if a predefined winning event occurs, the machine awards a prize; and wherein said game controller being arranged to play a feature game where, during play of the feature game, feature images associated with the feature game are displayed on the second display, and wherein the feature game is arranged to award a progressive prize and a fixed prize, wherein: a) awarding the progressive prize is caused by the system controller, the system controller notifying one of the gaming machines about the progressive prize being awarded; and b) awarding the fixed prize is caused by the game controller of one of the gaming machines and wherein one of the gaming machines notifies the system controller about the fixed prize being awarded and in response thereto the system controller causes details of the fixed prize to be displayed on the remote display that is remote to the gaming machines; and the remote display being visible to a player playing any one of the gaming machines, at least certain of the feature images having first image content occurring on the second display of a said gaming machine during the playing of the feature game on that gaming machine cooperating with different feature images having second image content different from the first image content, displayed on the remote display to communicate an outcome of the feature game on the gaming machine, wherein there are a plurality of different outcomes possible from the feature game and wherein feature images displayed on the remote display during play of the feature game represent that there are a plurality of possible outcomes of the feature game, and wherein the determination of a feature outcome for one of the gaming machines affects a subsequent determination of a feature outcome for another one of the gaming machines.

2. The system of claim 1 in which a predetermined trigger condition, triggered by one of the game controller and the system controller, occurring during playing of a base game on any one of the gaming machines causes the feature game to commence, the trigger condition being configured so that, when it occurs on any one of the gaming machines, all active gaming machines enter the feature game, wherein the feature outcome for each of the gaming machines is dependent on both a selection made by a player during play of the feature game and any earlier determinations of a feature outcome on another one of the active gaming machines.

3. The system of claim 1 in which the feature game is an ongoing feature where, whenever a trigger condition, triggered by one of the game controller and the system controller, occurs on any one gaming machine to trigger the feature game, the feature game is played on that gaming machine, including the display of the feature images on the second display and the display of the at least certain different feature images on the remote display, any other gaming machines continuing with their respective games until the feature game is triggered on said any other gaming machines.

4. The system of claim 2 wherein when the feature game is initiated, an initial display on the first display of the gaming machine includes icons relating to the feature images on the second display of that gaming machine, the icons being selectable by the player to directly affect both the content of the feature images on the second display and the at least certain different feature images on the remote display.

5. The system of claim 1 in which each gaming machine includes a selector operable by a player of the feature game to enable the player to make at least one selection associated with the feature game, the selection affecting which one of the plurality of different outcomes occurs in the feature game, and wherein the same selections are available at each of the gaming machines when the feature game is played and wherein a prize associated with a said selection is awarded at the first gaming machine to provide the feature game and have the selector operated to select that selection.

6. The system of claim 5 in which the feature game involves playing for prizes associated with the remote display, wherein the selection directly affects which one of a plurality of possible prizes is awarded and wherein after prize has been won from a particular selection, the prize subsequently associated with that same selection is determined according to a random selection process.

7. The system of claim 6 in which representations of the prizes are arranged, at least initially, in a concealed condition on the remote display and wherein the selection by the player is a selection of a said prize that is in a concealed condition, the selection of that prize resulting in the prize being revealed and awarded.

8. The system of claim 7 in which prizes are associated with predetermined, hidden places on a representation of a location displayed on the remote display.

9. The system of claim 8 in which the images appearing at least on the first display of each participating gaming machine are synchronized with the images appearing on the remote display.

10. The system of claim 9 in which a representation of the location similar to that displayed on the remote display is displayed on the first display and the player, using the selector, selects a position on the representation of the location which the player believes will result in a prize-winning outcome of the feature game.

11. The system of claim 1 in which one of the game controller and the system controller causes a prize to be replaced whenever any prize is revealed during playing of the feature game.

12. The system of claim 11 in which the feature game comprises a fixed set of prizes.

13. The system of claim 12 in which the fixed set of prizes includes progressive jackpot prizes.

14. A gaming machine having a first display and a game controller arranged to control images of symbols displayed on the first display, the game controller being arranged to play a game wherein at least one random event is caused to be displayed on the first display and, if a predefined winning event occurs, the machine awards a prize, the gaming machine further including a second display, arranged apart from the first display;

wherein said game controller being further arranged to communicate with a system controller being remote from said gaming machine, and a remote display arranged remote from, but visible to a player of, the gaming machine; and wherein said game controller being arranged to play a feature game where, during play of the feature, feature images associated with the feature game are displayed on the second display, at least certain of the feature images having first image content occurring on at least one of the displays of at least one of the gaming machines during the playing of the feature game on the at least one gaming machine cooperating with different feature images having second image content different from the first image content, displayed on the remote display to communicate an outcome of the feature game on the gaming machine, wherein the at least certain of the feature images occurring on the gaming machine during the playing of the feature game comprise a sequence of images and the at least certain different feature images displayed on the remote display comprise different representations of the same sequence of images, and wherein the feature game is arranged to award a progressive prize and a fixed prize, wherein: a) awarding the progressive prize is caused by the system controller, the system controller notifying the gaming machine about the progressive prize being awarded; and b) awarding the fixed prize is caused by the game controller of the gaming machine and wherein the gaming machine notifies the system controller about the fixed prize being awarded and in response thereto the system controller causes details of the fixed prize to be displayed on the remote display that is remote to the gaming machine.

15. The gaming machine of claim 14 which includes a selector operable by the player of the feature game to enable the player to make at least one selection associated with the feature game that directly affects the content of the sequence of images displayed on the second display and the at least certain different images displayed on the remote display.

16. The gaming machine of claim 15 in which the selector is a touch-screen facility of the first display.

17. The gaming machine of claim 14 which includes a cabinet in which the first display is mounted.

18. The gaming machine of claim 17 which includes a top box mounted on the cabinet, the second display being mounted in the top box.

19. The gaming machine of claim 14 in which the game comprises a base game preceding the feature game, the feature game following the occurrence of a trigger condition in the base game.

20. The gaming machine of claim 19 in which the base game preceding the feature game is a spinning reel game.

21. A method of operating a gaming machine system, the system comprising a plurality of gaining machines linked to a system controller, which is remote to the gaming machines, and to a remote display, each gaming machine comprising a first display and a game controller arranged to control images of symbols displayed on the first display, a second display, arranged apart from the first display, a feature game where, during play of the feature, feature images associated with the feature game are displayed on the second display, the feature images being used to communicate an outcome associated with the feature game, the method comprising causing the feature game to commence following the occurrence of a trigger condition occurring during the playing of a base game on at least one of the gaming machines of the system; and causing feature images having first image content occurring on at least one of the displays of at least one of the gaming machines during the playing of the feature game on the at least one gaming machine to cooperate with different feature images having second image content different from the first image content, occurring on the remote display and using the feature images in determining a feature outcome on the at least one gaming machine participating in the feature game;

wherein there are a plurality of different outcomes possible from the feature game and feature images displayed on the remote display during play of the feature game represent that there are a plurality of possible outcomes of the feature game, and wherein the method includes identifying the determination of a feature outcome for one of the gaming machines and dependent on the identification changing a subsequent determination of a feature outcome for another one of the gaming machines, and wherein the feature game is arranged to award a progressive prize and a fixed prize, wherein: a) awarding the progressive prize is caused by the system controller, the system controller notifying one of the gaming machines about the progressive prize being awarded; and b) awarding the fixed prize is caused by the game controller of one of the gaming machines and wherein one of the gaming machines notifies the system controller about the fixed prize being awarded and in response thereto the system controller causes details of the fixed prize to be displayed on the remote display that is remote to the gaming machines.

22. The method of claim 21 which includes causing a predetermined trigger condition occurring during playing of a base game on any one of the gaming machines to commence the feature game.

23. The method of claim 22 which includes configuring the trigger condition so that, when it occurs on any one of the gaming machines, all active gaming machines enter the feature game.

24. The method of claim 22 or claim 23 which includes causing the system controller to control occurrence of the trigger condition.

25. The method of claim 24 in which the system controller randomly selects a number representative of a monetary amount falling in a fixed range between a lower value and an upper value of a progressive jackpot and when the progressive jackpot value is incremented to that value by one of the linked gaming machines, the feature game is initiated by the system controller and all gaming machines of the system being played at that time commence the feature game.

26. The method of claim 25 which includes setting other conditions with which a player must comply in order to be eligible to participate in the feature game.

27. The method of claim 21 in which the feature game is an ongoing feature where, whenever a trigger condition occurs on any one gaming machine to trigger the feature game, the feature game commences on that gaming machine, any other gaming machines continuing with the base game until the feature game is triggered on said any other gaming machines.

28. The method of claim 22 which includes displaying on the second display of each gaming machine a plurality of feature images and, when the trigger condition occurs in the base game and the feature game is initiated, displaying as an initial display on the first display of the gaming machine icons relating to the feature images on the second display of that gaming machine.

29. The method of claim 21 which includes playing for prizes associated with the remote display during the feature game.

30. The method of claim 29 which includes, at least initially, concealing representations of the prizes on the remote display.

31. The method of claim 30 which includes associating prizes with predetermined, hidden places on a representation of a location displayed on the remote display.

32. The method of claim 31 which includes displaying a representation of the location, similar to that displayed on the remote display, on the first display and prompting the player to select a position of the location which the player believes will result in a prize-winning outcome of the feature game.

33. The method of claim 21 which includes displaying a scene on the second display representative of the selected icon moving towards the location which is displayed on the remote display and on the first display of the gaming machine.

34. The method of claim 33 which includes displaying a representation of the selected icon arriving at the selected position at the location and revealing the representation of the prize.

35. The method of claim 34 which includes selecting the prize from a fixed set of prizes randomly distributed by one of the game controller and the system controller at the positions of the location.

36. The method of claim 35 which includes replacing a prize whenever any prize is revealed during playing of the feature game.

37. The method of claim 36 which includes, whenever any prize is revealed, replacing a prize of the same value as the revealed prize at the location but at a different position and, once again, hidden from view.

38. The method of claim 35 which includes, once a selection of a prize has been made, again randomly distributing all outcomes over all the positions of the location.

39. The method of claim 38 which includes randomly shuffling the set of prizes so that the next outcome is selected from a new distribution of prizes about the positions of the location.

40. A gaming machine system which includes a plurality of gaming machines, each of the gaming machines including a first display and a second display, and includes a remote display common to the plurality of gaming machines, each gaming machine providing a base game that is played according to a random selection process, the base game involving the award of a prize on the occurrence of a winning event during play of the base game, each gaming machine further communicating with a system controller that is remote to the gaming machines, and with a feature game that is available to the plurality of gaming machines, wherein during play of the feature game on a said gaming machine:

images are caused to be displayed on the base game representing a plurality of choices available to a player in the feature game, the gaming machine including a selector allowing the player to select one of the plurality of choices; and following selection of one of the plurality of choices, a sequence of images is displayed on the first display that represent the result of the selection made using the selector, the sequence of images representing that the selection affects the outcome of the feature game, at least a portion of the sequence of images displayed on the first display is duplicated on the remote display, and the second display shows an enlarged representation of at least a portion of the sequence of images displayed on the first display cooperating with other different images displayed on the second display, and wherein the feature game is arranged to award a progressive prize and a fixed prize, wherein: a) awarding the progressive prize is caused by the system controller, the system controller notifying one of the gaming machines about the progressive prize being awarded; and b) awarding the fixed prize is caused by the game controller of one of the gaming machines and wherein one of the gaming machines notifies the system controller about the fixed prize being awarded and in response thereto the system controller causes details of the fixed prize to be displayed on the remote display that is remote to the gaming machines.

41. The gaming machine system of claim 40, wherein during play of the feature game on the gaming machine images are caused to be displayed on the first display representing a second plurality of choices available to a player in the feature game, the gaming machine including a selector allowing the player to select one of the plurality of choices, wherein the second plurality of choices are customisations of the sequence of images on at least one of the displays that do not have an effect on, and are not represented as affecting, the outcome of the feature game.

* * * * *

UNITED STATES PATENT AND TRADEMARK OFFICE

CERTIFICATE OF CORRECTION

PATENT NO. : 8,152,632 B2
APPLICATION NO. : 10/776145
DATED : April 10, 2012
INVENTOR(S) : Colin Fong It is certified that error appears in the above-identified patent and that said Letters Patent is hereby corrected as shown below:

On the Title Page:

Column 1 insert:

Item --(30) Foreign Application Priority Data
February 12, 2003 (AU)..........2003900619--.

Signed and Sealed this
Twenty-fourth Day of June, 2014

Michelle K. Lee

Michelle K. Lee
*Deputy Director of the United States Patent and Trademark Office*